(12) United States Patent
Pouilly-Cathelain et al.

(10) Patent No.: US 11,803,171 B2
(45) Date of Patent: Oct. 31, 2023

(54) METHOD FOR CONTROLLING AN ACTUATOR IN A NESTED FRICTION MECHANICAL SYSTEM

(71) Applicant: SAFRAN ELECTRONICS & DEFENSE, Paris (FR)

(72) Inventors: Maxime Pouilly-Cathelain, Moissy-Cramayel (FR); Philippe Feyel, Moissy-Cramayel (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 17/773,315

(22) PCT Filed: Oct. 23, 2020

(86) PCT No.: PCT/EP2020/079953
§ 371 (c)(1),
(2) Date: Apr. 29, 2022

(87) PCT Pub. No.: WO2021/083814
PCT Pub. Date: May 6, 2021

(65) Prior Publication Data
US 2022/0382242 A1    Dec. 1, 2022

(30) Foreign Application Priority Data

Oct. 30, 2019  (FR) ...................................... 1912230

(51) Int. Cl.
*G05B 19/404* (2006.01)
*G05B 19/418* (2006.01)

(52) U.S. Cl.
CPC ..... *G05B 19/404* (2013.01); *G05B 19/41885* (2013.01); *G05B 2219/32091* (2013.01); *G05B 2219/41154* (2013.01)

(58) Field of Classification Search
None
See application file for complete search history.

(56) References Cited

U.S. PATENT DOCUMENTS

| | | | |
|---|---|---|---|
| 6,505,703 B2 * | 1/2003 | Stout | B62D 6/008 701/41 |
| 6,901,320 B2 * | 5/2005 | Yao | B62D 5/0463 701/44 |

(Continued)

OTHER PUBLICATIONS

Sincar, Eyyup, et al., Compensation of friction effects in gyro-stabilized motion platforms, 2015 American Control Conference, Jul. 1, 2015, pp. 3242-3248.

(Continued)

*Primary Examiner* — Jason Lin
(74) *Attorney, Agent, or Firm* — Muncy, Geissler, Olds & Lowe, P.C.

(57) ABSTRACT

A method of controlling an electrical actuator of a mechanical system having a plurality of nested zones of contact, the method comprising the steps of:
  acquiring data about the mechanical system, which system includes a number of nested zones of contact;
  preparing a model of the system on the basis of said data and of a number of LuGre models put in parallel equal to the number of nested zones of contact, and determining parameters of the model and also a compensation structure for compensating friction in the nested zones of contact;
  including the compensation structure in a control relationship for the actuator A; and
  controlling the actuator by means of the control relationship.

7 Claims, 3 Drawing Sheets

(56) References Cited

U.S. PATENT DOCUMENTS

| | | | | |
|---|---|---|---|---|
| 7,276,877 | B2* | 10/2007 | Qiu | H02P 21/13 318/632 |
| 8,013,560 | B2* | 9/2011 | Sasaki | G05B 19/404 318/632 |
| 8,427,094 | B2* | 4/2013 | Okitsu | G05D 3/10 318/632 |
| 8,442,692 | B2* | 5/2013 | Okitsu | G05B 13/042 360/78.04 |
| 2011/0248661 | A1* | 10/2011 | Okitsu | G05D 3/10 318/632 |
| 2012/0001582 | A1* | 1/2012 | Park | G05B 13/048 318/632 |
| 2017/0261529 | A1* | 9/2017 | Tsai | G05B 17/02 |
| 2019/0317472 | A1 | 10/2019 | Zhi et al. | |

OTHER PUBLICATIONS

De Wit, C Canudas, et al., A new model for control of systems with friction, IEEE Transactions on Automatic Control vol. 40, issue 3, Mar. 1995, pp. 419-425.

Lampaert, Vincent et al., Modification of the Leuven integrated friction model structure, IEEE Transactions on Automatic Control vol. 47, issue 4, Apr. 2002, pp. 683-687.

Lampaert, Vincent, A generalized Maxwell-slip friction model appropriate for control purposes, 2003 IEEE International Workshop on Workload Characterization vol. 4, IEEE, Aug. 20, 2003.

Feyel, Philippe, et al., LuGre friction model identification and compensator tuning using a Differential Evolution algorithm, 2013 IEEE Symposium on Differential Evolution, IEEE, Apr. 16, 2013.

Storn, Rainer et al., Differential evolution—a simple and efficient heuristic for global optimization over continuous spaces, Journal of Global Optimization vol. 11, issue 4, Dec. 1997, pp. 341-359.

* cited by examiner

METHOD FOR CONTROLLING AN ACTUATOR IN A NESTED FRICTION MECHANICAL SYSTEM

The present invention relates to the field of controlling electrical actuators in mechanical systems that include a movable element that is movable relative to a stationary element.

BACKGROUND OF THE INVENTION

Numerous mechanical systems incorporate one or more electrical actuators, such as electromechanical actuators, that are connected to an electrical power supply and that are controlled to move the movable element of the mechanical system relative to the stationary element in a manner that is very accurate. Each actuator is controlled on the basis of a control relationship, e.g. associating parameters of the electrical power supplied to the actuator with positions or speeds of the movable element.

When two parts having friction surfaces in contact that rub against each other when the movable element moves, it is necessary to control the actuator so that it produces sufficient force to overcome such friction and so that the movement takes place without jerking. For this purpose, the control relationship includes a compensation structure enabling the actuator to be powered so that it overcomes friction and moves the movable element in a manner that is smooth.

There are several models in existence that enable friction to be modelled. These models are based on the behavior of roughnesses present on the contacting services, and the roughnesses are modeled in the form of spring blades in such a manner that the spring blades of one of the contacting surfaces interact with rigid blades of the other contacting surface.

The LuGre model can be used to model friction when only two parts are in contact, and it enables a stable friction compensation structure to be derived therefrom, as described in the document by De Wit et al., "A new model for control of systems with friction", pages 419 to 425, No. 3, volume 40, IEEE Transactions on automatic control, 1995, IEEE. FIG. 1 shows a part P resting on a surface S and moving at a speed v with friction F opposing the movement of the part P, and also shows its representation in accordance with the LuGre model. The LuGre model is then written in the following form:

$$\begin{cases} \Gamma_f(t) = \sigma_0 z(t) + \sigma_1 \dot{z}(t) + \sigma_2 \omega(t) \\ \dot{z}(t) = \omega(t) = \frac{|\omega(t)|}{g(\omega(t))} z(t) \\ g(\omega) = \frac{\Gamma_c + (\Gamma_s - \Gamma_c)e^{-\left(\frac{\omega(t)}{\omega_s}\right)^2}}{\sigma_0} \end{cases}$$

where:
$\Gamma_f(t)$ is the total friction torque;
$\sigma_0$ is the stiffness of the spring blades;
$\sigma_1$ is the damping coefficient of the movement of the spring blades;
$\sigma_2$ is the viscous friction coefficient;
$\Gamma_c$ is the Coulomb torque;
$\Gamma_s$ is the Stribeck or static friction torque;
$\omega_s$ is the Stribeck angular velocity; and
$\omega$ is the relative angular velocity.

There exist other friction models that are more accurate than the LuGre model, but that are more complex in their structure (and are thus more complex to implement), such as the de Leuven model (described in the document by Lampaert et al., "Modification of the Leuven integrated friction model structure", pages 683 to 687, No. 4, volume 47, IEEE transactions on Automatic Control, 2002, IEEE) or the Generalized Maxwell Slip (GMS) model (Lampaert et al., "A generalized Maxwell-slip friction model appropriate for control purposes", pages 1170 to 1177, volume 4, 2003 IEEE International Workshop on Workload Characterization, 2003, IEEE). As a result of their complexity, those models can also be used to model mechanical architectures that are more complex. This is particularly true when a plurality of contacting surfaces are nested in one another, as happens with a shaft pivoting in a first bushing that is itself pivoting in a second bushing that in turn is pivoting in a bearing, possibly together with a sealing gasket rubbing against one or another of the moving parts: it is not possible to determine the individual contributions of the various contacting surfaces in the overall friction that exists between the shaft and the bearing.

Nevertheless, those models do not enable the friction that they model to be compensated in a manner that is stable.

OBJECT OF THE INVENTION

A particular object of the invention is to propose means for improving the accuracy and the precision of control over an actuator of a mechanical system having a plurality of contacting surfaces.

SUMMARY OF THE INVENTION

To this end, according invention, there is provided a method of controlling an electrical actuator of a mechanical system having a plurality of nested zones of contact, the method comprising the steps of:
  acquiring data about the mechanical system, which system includes a number of nested zones of contact;
  preparing a model of the system on the basis of said data and of a number of LuGre models equal to the number of nested zones of contact, and determining parameters of the model and also a compensation structure for compensating friction in the nested zones of contact;
  including the compensation structure in a control relationship for the actuator; and
  controlling the actuator by means of the control relationship.

The method of the invention makes it possible to model any type of multiple friction and to compensate effectively the friction as modelled in this way so as to obtain a control relationship that is particularly accurate and stabilizing.

Other characteristics and advantages of the invention appear on reading the following description of a particular and nonlimiting implementation of the invention.

BRIEF DESCRIPTION OF THE DRAWINGS

Reference is made to the accompanying drawings, in which.

DETAILED DESCRIPTION OF THE INVENTION

Figure 1:
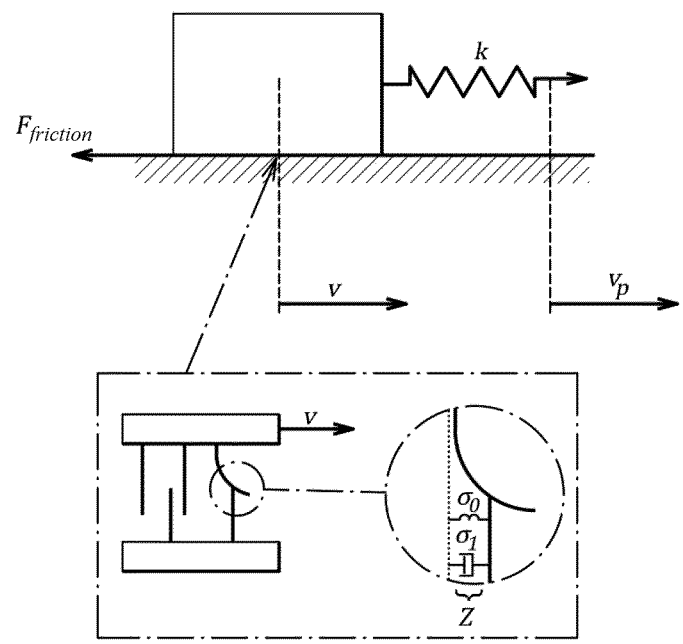
FIG. 1 is a representation of a friction situation and of the way it is modelled by the conventional LuGre model.
Figure 2:
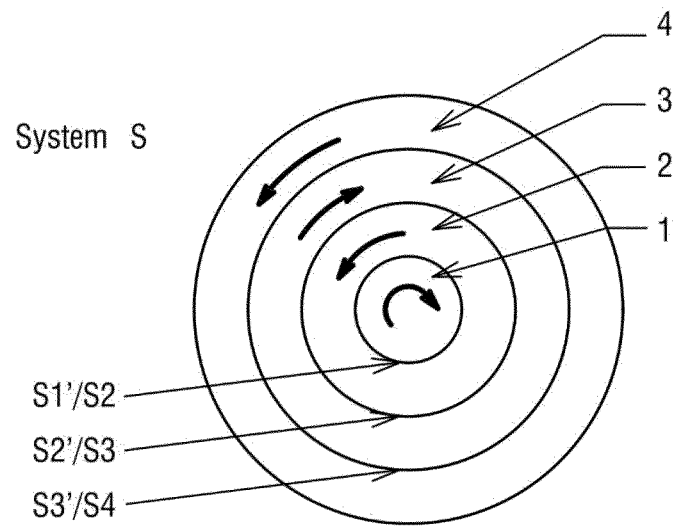
FIG. 2 is a diagrammatic view showing a rotating mechanical system in which the method of the invention can be implemented.

FIG. 2, the mechanical system used for illustrating the operation of the invention comprises four parts in relative friction, e.g. such as a rotor of an electric motor turning in a stator and constrained to rotate with a driven shaft that turns in a bearing for guiding rotation. In such an arrangement, there are at least three friction zones that are cumulative and that can be represented by four parts 1, 2, 3, and 4 that are coaxial one within another and that are rotating relative to one another, the four parts being in contact with one another as follows:

the part 1 has an outside surface S1' that is in contact with an inside surface S2 of the part 2;
the part 2 has an outside surface S2' that is in contact with an inside surface S3 of the part 3; and
the part 3 has an outside surface S3' that is in contact with the inside surface S4 of the part 4.

The system thus has three friction zones: S1'/S2, S2'/S3, and S3'/S4. These friction zones are said to be nested.

The method of the invention is arranged to control the electric motor, which constitutes the electrical actuator of the mechanical system. The control method comprises the steps of:

acquiring data about the mechanical system that comprises a number M of nested zones of contact;
preparing a model of the system, referred to as a M-LuGre model, on the basis of said data and of a number M of LuGre models put in parallel, where M is equal to the number of nested zones of contact, with this being done by using a stochastic optimization algorithm in order to determine parameters of the model and in order to determine a compensation structure for compensating friction in the nested zones of contact;
including the compensation structure in a control relationship for the actuator; and
controlling the actuator by means of the control relationship.

The M-LuGre model puts M LuGre models i in parallel in order to calculate the total friction torque $\Gamma_f(t)$ as follows:

$$\begin{cases} \Gamma_f(t) = \sum_{i=1}^{M}(\sigma_{0,i}z_i(t) + \sigma_{1,i}\dot{z}_i(t)) + \sigma_2\omega(t) \\ \dot{z}_i(t) = \omega(t) - \frac{|\omega(t)|}{g_i(\omega(t))}z_i(t) \\ g_i(\omega) = \frac{\Gamma_{c,i} + (\Gamma_{s,i} - \Gamma_{c,i})e^{-\left(\frac{\omega(t)}{\omega_{s,i}}\right)^2}}{\sigma_{0,i}} \end{cases}$$

in which, for each model i:
$\sigma_{0,i}$ is the stiffness of the spring blades representing the friction roughnesses;
$\sigma_{1,i}$ is the damping coefficient of the movement of the spring blades;
$\sigma_2$ is the coefficient of viscous friction (it should be observed that any need to make use of $\sigma_{2,i}$ is avoided by factorization);
$z_i$ is the mean deformation of the blade;
$\Gamma_{c,i}$ is the Coulomb torque;

$\Gamma_{s,i}$ is the static friction torque;
$\omega_{s,i}$ is the Stribeck angular velocity; and
$\omega$ is the measured relative angular velocity of the motor.

The compensation structure, which is of the feedback type, is based on an estimate of the above model and it has the following form:

$$g_i(\omega) = \frac{\Gamma_{c,i} + (\Gamma_{s,i} - \Gamma_{c,i})e^{-\left(\frac{\omega}{\omega_{s,i}}\right)^2}}{\sigma_{0,i}}.$$

$$\frac{d\hat{z}_i}{dt} = \omega - \frac{|\omega|}{g_i(\omega)}\hat{z}_i + k_{s,i}\varepsilon.$$

$$\varepsilon = \theta_c - \theta_r.$$

$$\hat{\Gamma}_f = \sum_{i=1}^{M}\left(\sigma_{0,i}z_i + \sigma_{1,i}\frac{d\hat{z}_i}{dt}\right) + \sigma_2\omega.$$

in which:
$\varepsilon$ is the error between the input setpoint or reference signal (for position or speed) and the resulting output signal $\Theta_r$ (position or speed depending on the input setpoint);
the variables $k_{s,i}$ are M in number and they are determined so as to improve the robustness of the compensator in the face of modifications to external conditions such as temperature or changes in the system itself; and
the other parameters and variables are as mentioned above with reference to the model.

Adjustment of the compensator includes the step of identifying all the parameters of each of the LuGre models i of the M-LuGre model and the step of determining the variables $k_{s,1}, \ldots, k_{s,i}, \ldots, k_{s,M}$ that ensure good operation and that stabilize the compensator.

The parameters of the M-LuGre model are defined by using a stochastic optimization algorithm, specifically a differential evolution algorithm. This algorithm is described in the document by P. Feyel et al., "LuGre Friction Model Identification and Compensator Tuning Using a Differential Evolution Algorithm", pages 85 to 91, 2013 IEEE Symposium on Differential Evolution (SDE), 2013, IEEE. Preferably, the algorithm is used several times in succession in order to refine determination of the parameters of the model. How to determine the adjustment parameters for the algorithm is itself known. It is possible to use the standard adjustment parameters for the differential evolution algorithm, such as those mentioned in documents by R. Storn and K. Price, "Differential Evolution—A Simple and Efficient Heuristic for Global Optimization over Continuous Spaces", pages 341-359, Journal of Global Optimization 11, Kluwer Academic Publisher, 1997.

Figure 5:
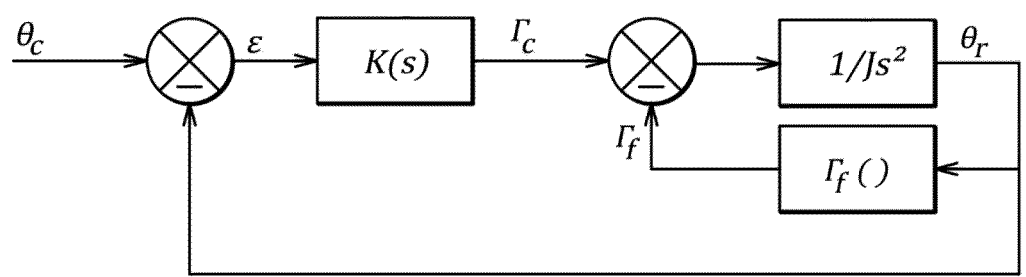
FIG. 5 is a diagram of a servo control loop used for implementing the method of the invention.

In this example, the data for the mechanical system comprise its specifications and the results of tests or simulations performed on a servo control loop such as that shown in FIG. 5 for a system that is actuated by an actuator of the direct current (DC) motor type in order to move a load that is assumed to be a pure inertial mass J. It can be understood that the servo control loop receives the setpoint $\Theta_c$ as input and that it delivers the output $\Theta_r$. On the basis of the setpoint $\Theta_c$, there are determined both the product $Js^2$, which is the torque needed to move the load through an angle $\theta_c$, and also the error $\varepsilon$ between the setpoint $\Theta_c$ and the output $\Theta_r$. The error $\varepsilon$ is used in the corrector K(s) that delivers the command corresponding to the Coulomb torque $\Gamma_c$ from which there is subtracted the total friction $\Gamma_s( )$ as extracted from the output. The result of this subtraction is divided by the product $Js^2$ in order to obtain the output $\Theta_r$.

Data is obtained for various different scenarios (corresponding to different conditions of use, in particular temperature, and to different power supply parameters for each of those conditions of use), and by way of example it may comprise: parameters (voltage, current) of the power supplied to the electrical actuator, speed of movement and force as delivered by the actuator as a function of the power supply parameters, speed of movement and force that are to be obtained at the output from the mechanical system, . . . , which signals are sampled.

Thereafter, the differential evolution algorithm is used with the following cost function, for a temperature Tc:

$$f_{T_c}(V) = \sum_{k=1}^{N_m}\left(\frac{1}{N_{s,k}}\sum_{i=1}^{N_{s,k}}(\theta_r[i] - \hat{\theta}_r[i])^2\right),$$

in which:
Nm is the number of scenarios;
$N_{s,k}$ is the number of samples; and
$\hat{\Theta}_r$ is the output from the model as simulated with the following decision vector ($\sigma_{0,i}$, $\sigma_{1,i}$, $\sigma_2$, $\Gamma_{c,i}$, $\Gamma_{s,i}$, $\omega_{s,i}$), where i varies from 1 to M so that a vector of (5M+1) parameters needs to be adjusted.

Figure 4:
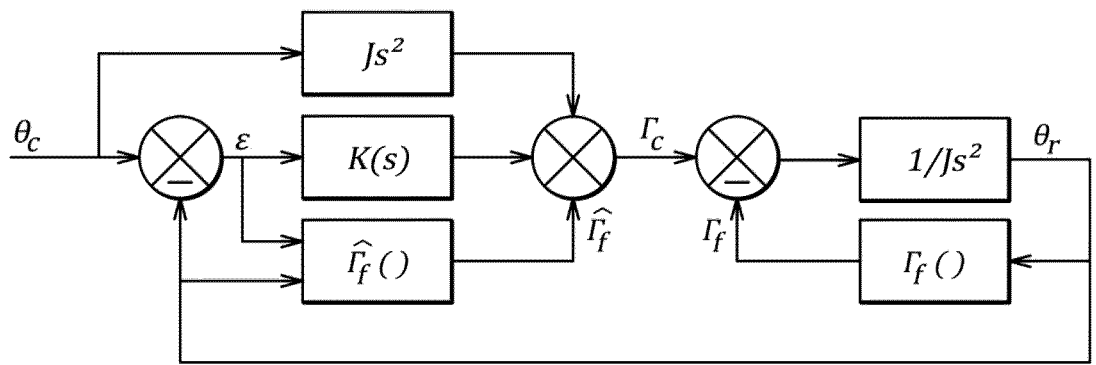
FIG. 4 is a diagrammatic representation of the compensator of the control device.

Once the parameters of the M-LuGre model have been determined for the various scenarios, it is possible to run a simulation on the basis of the servo control loop of FIG. 4 so as to determine both the command and the sampled error for a given set of variables $k_{s,1}, \ldots, k_{s,i}, \ldots, k_{s,M}$. For this purpose, the differential evolution algorithm is used once more, but with the following cost function:

$$f(V) = \sum_{k=1}^{N_T}\frac{1}{N_{s,k}}\left(\begin{array}{l}\sum_{i=1}^{N_{s,k}}(\text{Error}_k^2[i] + \alpha\Gamma_{c,k}^2[i]) + \\ \beta\sum_{i=2}^{N_{s,k}}(\Gamma_{c,k}[i] - \Gamma_{c,k}[i-1])^2\end{array}\right),$$

in which:
$N_T$ is the number of scenarios tested;
$N_{s,k}$ is the number of samples;
$\Gamma_{c,k}$ is the command; and
$\alpha$ and $\beta$ are positive real numbers selected to harmonize orders of magnitude or to give greater importance to the error, to the command, or to the variation of the command. For example: if $\alpha$ and $\beta$ are much less than 1, the error is amplified; if $\beta$ is zero, the derivative of the command is high.

Figure 3:
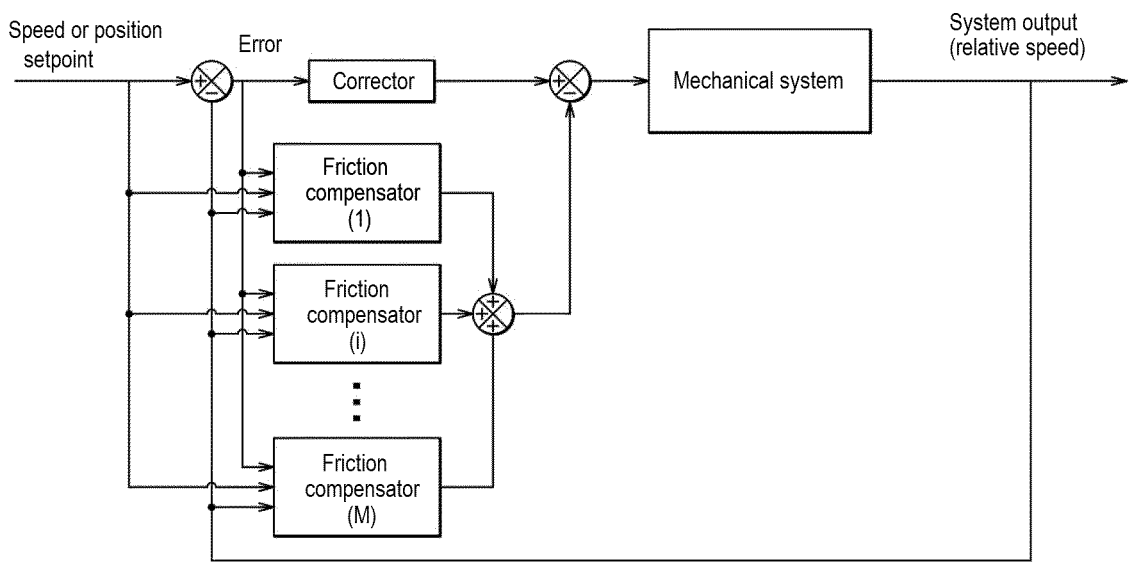
FIG. 3 is a diagrammatic view of the control device.

FIGS. 3 and 4 show a feedback type compensator for a system that is actuated by a DC motor type actuator moving a load that is assumed to be a pure inertial mass J.

It can be understood that the compensator receives as input the setpoint $\Theta_c$ from which there are determined both the product $Js^2$ and the error $\varepsilon$ between the setpoint $\Theta_c$ and the output $\Theta_r$. In this example, the compensator has a compensation structure that is itself known (De Wit et al., "A new model for control of systems with friction", pages 419 to 425, No. 3, volume 40, IEEE Transactions on automatic control, 1995, IEEE). The error $\varepsilon$ is used in the corrector K(s) and in the compensator $\hat{\Gamma}_f(\ )$ and their outputs are added to the product $Js^2$ in order to obtain the Coulomb torque $\Gamma_c$ from which there is subtracted the total friction $\Gamma_s(\ )$ that results from the model. The result is divided by the product $Js^2$ in order to obtain the output $\Theta_r$.

This gives rise to a control relationship that incorporates friction compensation and that can be used to control the actuator in a manner that is effective, smooth, and stabilizing, since the structure of the original LuGre compensation is conserved.

Naturally, the invention is not limited to the implementation described, but covers any variant coming within the field of the invention as defined by the claims.

In particular, the method of the invention can be used for controlling an actuator of any kind of mechanical system. Such a mechanical system is to produce accurate movement of a movable element, e.g. for aiming an optical or chronic member in a given direction. A mechanical system may comprise parts that are movable in rotation and/or in translation.

The term "LuGre model" is used to cover both the LuGre model as defined initially, and also its derivatives such as the Dahl and Coulomb models.

The compensation structure may be of a type other than the feedback type, example it could be of feedforward type.

It is possible to use some other stochastic algorithm, or an algorithm other than a stochastic algorithm. For example, it is possible to use the simplex algorithm, the pattern search algorithm, the subgradient method algorithm, the coordinate descent algorithm, . . . .

Using a global optimization algorithm without a gradient (referred to as a "derivative free optimization algorithm" in the literature) makes it easier to perform the method, but is not essential.

The invention claimed is:

1. A method of controlling an electrical actuator of a mechanical system having a plurality of nested zones of contact, the method comprising the steps of:
   acquiring data about the mechanical system, which system includes a number of nested zones of contact;
   preparing a model of the system on the basis of said data and of a number of LuGre models equal to the number of nested zones of contact, and determining parameters of the model and also a compensation structure for compensating friction in the nested zones of contact;
   including the compensation structure in a control relationship for the actuator; and
   controlling the actuator by means of the control relationship.

2. The method according to claim 1, wherein the parameters of the model are determined by using a gradient free global optimization algorithm.

3. The method according to claim 2, wherein the gradient free global optimization algorithm is a stochastic algorithm.

4. The method according to claim 3, wherein the stochastic algorithm is a differential evolution algorithm.

5. The method according to claim 1, wherein modelling parameters specific to each of the LuGre models i are:
   stiffness ($\sigma_{0,i}$) of blades representing friction;
   damping coefficient ($\sigma_{1,i}$) of movement of the blades;
   viscous friction coefficient ($\sigma_2$);
   Coulomb friction torque ($\Gamma_{C,i}$);
   static friction torque ($\Gamma_{S,i}$);
   Stribeck angular velocity ($\omega_{S,i}$); and
   global relative speed of the actuator ($\omega$).

6. The method according to claim 1, wherein the compensation structure is of the feedback type.

7. The method according to claim 1, wherein the compensation structure is of the feedforward type.

* * * * *